United States Patent [19]
Gariazzo

[11] 3,898,648
[45] Aug. 5, 1975

[54] SYNCHRO-TO-DIGITAL CONVERTER
[75] Inventor: Michael C. Gariazzo, Bowie, Md.
[73] Assignee: The United States of America as represented by the Secretary of the Navy, Washington, D.C.
[22] Filed: Dec. 7, 1973
[21] Appl. No.: 422,619

[52] U.S. Cl. .................. 340/347 SY; 340/347 AD
[51] Int. Cl.² ........................................ G08C 9/04
[58] Field of Search ............... 340/347 SY, 347 AD

[56] References Cited
UNITED STATES PATENTS
3,533,097  10/1970  Sleven ............................... 340/347
3,573,801  4/1971   Cohen et al. ...................... 340/347

Primary Examiner—Charles E. Atkinson
Assistant Examiner—Vincent J. Sunderdick
Attorney, Agent, or Firm—R. S. Sciascia; J. A. Cooke; Sol Sheinbein

[57] ABSTRACT

A synchro to digital converter analyzing the three synchro signals and determining which 30° zone is being examined by the relative amplitudes of the signals and selecting a base angle, and modifying said base angle by an angle of arc tan $$\frac{.866\ S_{min}}{S_{max} - .5 S_{min}}$$

wherein $S_{max}$ is the largest synchro signal value and $S_{min}$ is the smallest synchro signal value.

2 Claims, 2 Drawing Figures

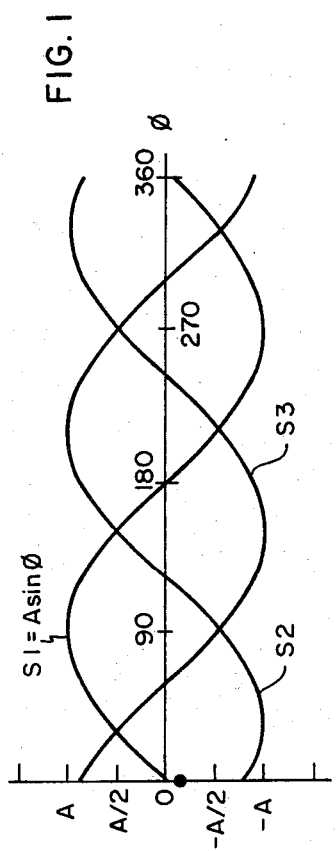
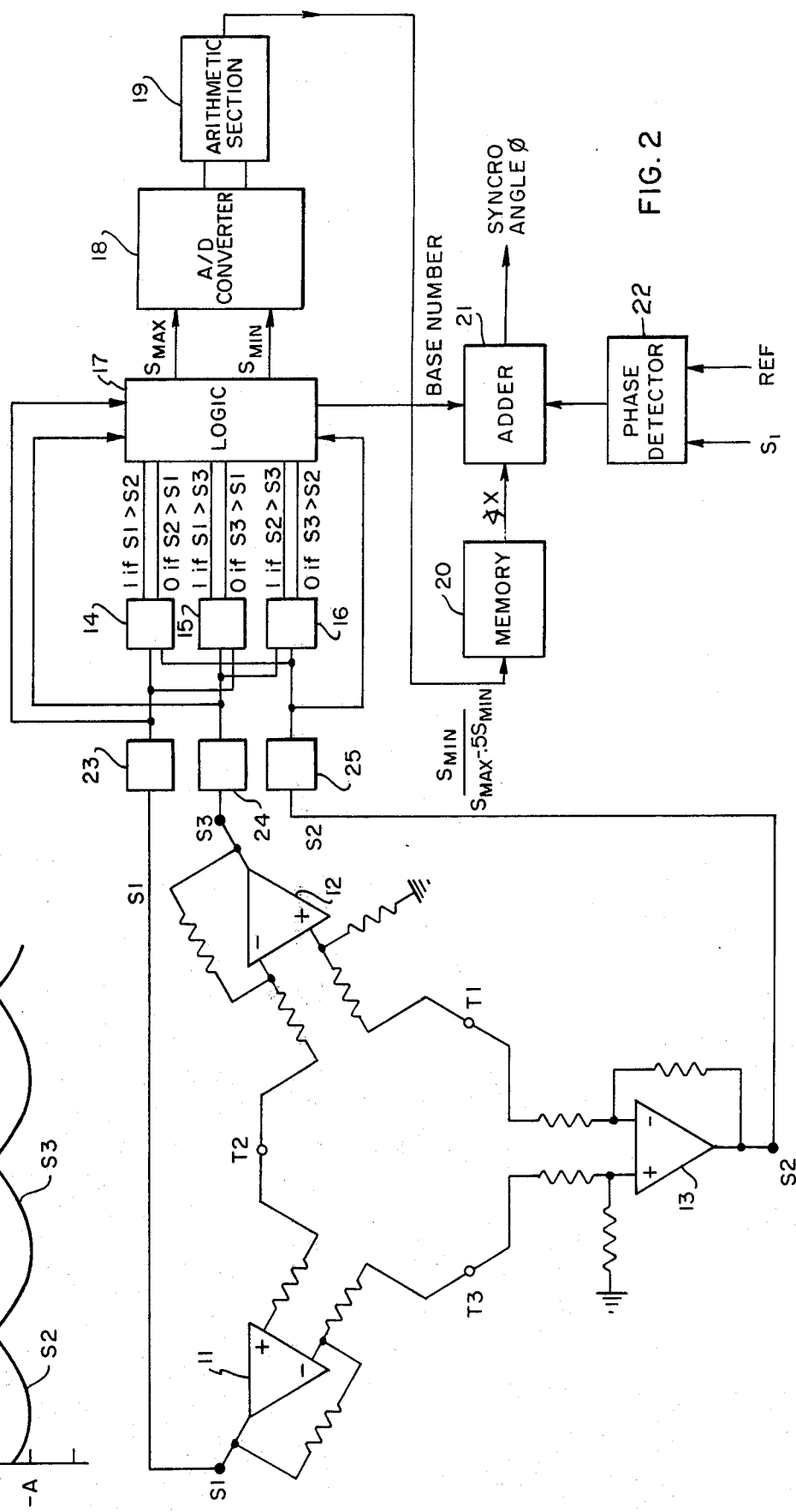

SYNCHRO-TO-DIGITAL CONVERTER

BACKGROUND OF THE INVENTION

This invention relates to means of converting synchro rotor angular position to a digital number representative of that position, and more particularly to the obtaining of an accurate digital expression of rotor position based on the angle of the rotating field produced in the receiver by the three secondary winding voltages induced by the synchro transmitter rotor.

It is often necessary to convert the rotor position of a synchro in a servomechanism into a digital readout. While the first known types of converters were mechanical and electromechanical, better service devices were entirely electrical. Complete electrical converters are known that use the three synchro input voltages and convert these by a Scott transformer into sine and cosine voltages. Analog voltages are then used as representation of shaft or rotor angle. Later the analog voltages were converted to digital readout by analog-to-digital (A/D) converters. Those prior art devices were not as small, inexpensive, versatile and accurate as desired.

SUMMARY OF THE INVENTION

Accordingly, there is described according to the present invention a synchro to digital converter that determines the 30° zone one is examining by observing the absolute amplitudes of the three rotor signals. A base angle/number is determined and another angle X = arc tan $$\frac{.866\, S_{min}}{S_{max} - .5\, S_{min}}$$

is either added or subtracted (based on the zone) from that base number. An additional 180° may be added to these two signals if rotor signal S1 is out of phase with the reference.

OBJECTS OF THE INVENTION

It is therefore an object of the present invention to provide a synchro to digital converter independent of the frequency of the reference voltage and tolerating wide variations in signal voltage amplitudes.

Another object of the present invention is to provide a synchro to digital converter insensitive to power supply variation and of extreme accuracy.

Still another object of the present invention is to provide a cost effective solid state synchro to digital converter.

BRIEF DESCRIPTION OF THE DRAWINGS

These and other objects and the attendant advantages, features, and uses will become more apparent to those skilled in the art as a more detailed description proceeds when considered with the accompanying drawings, in which:

FIG. 1 is a graph showing the envelopes of the synchro signals.

FIG. 2 is a block and circuit schematic of the synchro to digital converter in accordance with the teachings of the present invention.

DESCRIPTION OF THE PREFERRED EMBODIMENT

A synchro transmission comprises three sinusoidal signals, henceforth S1, S2 and S3, the amplitudes of which are proportional to sin $\theta$, sin ($\theta-120°$), and sin ($\theta +120°$), respectively, where $\theta$ is the angle of displacement. Referring to FIG. 1 there is a graph showing the envelopes of S1, S2 and S3 as $\theta$ varies from 0° to 360°. Positive values on the envelope curves signify that the signals are in phase with the reference voltage, while negative values correspondingly indicate a 180° phase difference.

Inspection of FIG. 1 indicates that only one of the three envelopes S1, S2 and S3 is less (in absolute value) than A/2 at any given angle $\theta$, wherein A is the maximum value of the sinusoidal signals. Additionally, in each 30° zone for which a given |Si| (absolute value of the sine wave, wherein $i$=1, 2, 3) is less than A/2, there is a unique relationship among the amplitudes |Si| which defines the range of the zone according to the following chart.

| Zone | Amplitude Relationship (Abs. Value) | Phase of S1 W.R.T. Ref. |
|---|---|---|
| 0–30 | S2>S3>S1 | In phase |
| 30–60 | S2>S1>S3 | " |
| 60–90 | S1>S2>S3 | " |
| 90–120 | S1>S3>S2 | " |
| 120–150 | S3>S1>S2 | " |
| 150–180 | S3>S2>S1 | " |
| 180–210 | S2>S3>S1 | Out of phase |
| 210–240 | S2>S1>S3 | " |
| 240–270 | S1>S2>S3 | " |
| 270–300 | S1>S3>S2 | " |
| 300–330 | S3>S1>S2 | " |
| 330–360 | S3>S2>S1 | " |

By comparing the amplitudes of S1, S2 and S2 it can be determined which 30° section is being considered, with the ambiguity of 0° − 30° or 180° − 210°, et seq, resolved by considering the phase of S1. Furthermore, by selecting in each 30° range the maximum value of a sinusoidal wave $S_{max}$ and the minimum value of a sinusoidal wave $S_{min}$, and combining them arithmetically to yield an expression for the angle X wherein $$X = \text{arc sin}\left(\frac{S_{min}}{A}\right),$$

it is possible to locate the position within the 30° range.

A synchro system satisfies the following relationships wherein $e_i$ are peak signal voltages $$e_1 = |A \sin \theta| \qquad (1)$$

$$e_2 = |A \sin (\theta + 120°)| \qquad (2)$$

$$e_3 = |A \sin (\theta - 120°)| \qquad (3)$$

Expanding (3), $$e_3 = |A \sin \theta \cos (-120°) + A \cos\theta \sin (-120°)| \quad (4)$$

$$e_3 = |-.5\, A \sin \theta - .866\, A \cos \theta| \qquad (5)$$

$$e_3 - .5 A \sin \theta = .866 A \cos \theta \quad \theta \leq 30° \quad (6)$$

$$e_3 - .5e_1 = .866 A \cos \theta \quad (7)$$

$$\frac{e_1}{e_3 - .5e_1} = \frac{A \sin \theta}{.866 A \cos \theta} \quad (8)$$

$$\frac{.866 e_1}{e_3 - .5e_1} = \tan \theta \quad \theta \geq 30° \quad (9)$$

Substituting $S_{min}$ (smallest of the three synchro signals) for $e_1$ and $S_{max}$ (the largest of the three) for $e_3$, equation (9) yields an expression for X (substituted for $\theta$) which is independent of the value of A. A read only memory storing $$\text{arc tan} \frac{.866 \, S_{min}}{S_{max} - .5 S_{min}} \quad (10)$$

would supply X in digital form.

The following algorithm defines the procedure for computing the total angle of displacement, $\theta$:

| Detected Range | Base angle number | Add/subtract X |
|---|---|---|
| 0–30 | 0 | Add |
| 30–60 | 60 | Subtract |
| 60–90 | 60 | Add |
| 90–120 | 120 | Subtract |
| 120–150 | 120 | Add |
| 150–180 | 180 | Subtract |

For S1 out of phase with reference, add additional 180°.

Alternatively adding and subtracting the angle X as successive 30° regions are crossed, eliminates the possibility of introducing a large error as a result of an incorrect decision in magnitude comparison. Such an untoward decision might be made at any integer multiple of 30°, where two of the signals become equal. For example, at 30°, S1 = S3. However, if the decision making circuitry to be described hereinafter decides S3 > S1 (it must make some decision), then X is added to the base number 0° (range 0°–30° is decided upon since S2>S3>S1) and the result makes $\theta = 0° + X = 30°$. On the other hand, if the decision is S1>S3 then X is subtracted from the base number 60°, (range 30° - 60° is decided upon since S2>S1>S3) and the result is the same $\theta = 60° - X = 30°$.

Referring now to FIG. 2 there is shown a block diagram of the converter to perform the aforementioned calculations. Synchro signals S1, S2 and S3 are detected by measuring the terminal to terminal voltages T2 - T3, T3, T3 - T1 and T1 - T2 in operational amplifiers 11, 12, 13 respectively, wherein T1, T2, and T3 are the synchro signal inputs. Conventional peak sample-and-hold circuits 23, 24, 25, such as envelope detectors convert these signals to proportional d.c. equivalents. Each of the three d.c. signals S1, S2 and S3 is compared to the other two by means of differential comparators 14, 15, 16 to produce binary bits according to the relative amplitude of S1, S2 and S3. The respective bit outputs of the three differential comparators 14, 15 16 supply a conventional logic network 17 with the information required to decide (a) which two of the three signals S1, S2, S3 are smallest and largest, (b) in what range $\theta$ belongs (and hence, what base number to add), and (c) whether the angle X is to be added or subtracted.

Logic network 17 also supplies decoded information identifying which two of signals S1, S2 and S3 have the least and greatest magnitudes to select analog signals $S_{max}$ and $S_{min}$, which then undergo analog to digital conversion in conventional analog to digital converter 18. Arithmetic section 19 receives the digital signals $S_{max}$ and $S_{min}$ from the A/D converts to produce argument A $$A = \frac{S_{min}}{S_{max} - .5 S_{min}} \quad (11)$$

as an address for read only memory 20, programmed with a function X (A) = arc tan 0.866 A, where A is described in equation (11). For example, at address A = 0.5, the angle X would be 23.4° and the memory 20 would store that number. Angle X from memory 20 is supplied to adder 21 where it is added or subtracted from the base number from logic network 17.

As mentioned previously, an additional 180° must be added to the arithmetic combination of X and the base member whenever signal S1 is 180° out of phase with the reference voltage. A conventional phase detector 22 determines whether S1 is in phase or not, and the addition of 180° is dependent upon that decision.

The digital equivalent to the synchro angular position is obtained by adding together the base number arrived at by logic 17, the angle X or −X determined by memory 20, and the decision to whether 180° is to be added as determined by phase detector 22.

Thus there has been described a novel system for producing a digital indication of a rotor position, which is completely independent of the frequency of the reference voltage. The system tolerates wide variations in signal voltage amplitudes without affecting performance as well as being insensitive to power supply variations. It may be solid state, increasing its dependability and reducing its size, and it is of extremely high accuracy.

Obviously, many changes and modifications could be made in the construction and described uses of the foregoing synchro to digital converter and many seemingly different embodiments of the invention may be constructed without departing from the scope thereof. For example, analog circuitry could be used to perform the arithmetic quotient operation and thence convert the result into digital form prior to its addressing the memory. The function of memory 20 to calculation of arc tan 0.866A, could be effected by analog means, and A/D converter 18 could be modified to perform the function of arithmetic section 19.

Accordingly, it is intended that all matter contained in the above description or shown in the accompanying drawings shall be interpreted as illustrative and not in a limiting sense.

What is claimed as new and desired to be secured by Letters Patent is:

1. A synchro to digital converter having synchro signals S1, S2, and S3, comprising:
   means for comparing said three synchro signals with each other to determine the 30° zone being examined and producing a base angle based on said zone, and yielding $S_{min}$ and $S_{max}$, wherein $S_{max}$ is the largest synchro signal and $S_{min}$ is the smallest synchro signal of signals S1, S2, and S3;

means for converting analog signals $S_{max}$ and $S_{min}$ into digital form;

means for producing an angle X = arc tan $$\frac{S_{min}}{S_{max} - .5 S_{min}},$$

means for producing a phase detector angle;

means for adding said base angle with said angle X, and said phase detector angle to supply a synchro angle.

2. A synchro to digital converter as recited in claim 1 wherein said phase detector angle is either 0° or 180°.

* * * * *